United States Patent [19]

Marchetti et al.

[11] 4,450,566

[45] May 22, 1984

[54] PRE-IONIZING TRIGGER SYSTEM FOR A GAS LASER

[75] Inventors: Renato Marchetti; Eugenio Penco; Ugo Perito, all of Rome, Italy

[73] Assignee: Selenia, Industrie Elettroniche Associate, S.p.A., Rome, Italy

[21] Appl. No.: 349,513

[22] Filed: Feb. 17, 1982

[30] Foreign Application Priority Data

Feb. 20, 1981 [IT] Italy ............................... 47851 A/81

[51] Int. Cl.$^3$ ............................................. H01S 3/097
[52] U.S. Cl. ......................................... 372/38; 372/86; 372/87
[58] Field of Search ............................. 372/86, 87, 38

[56] References Cited

U.S. PATENT DOCUMENTS

| | | | |
|---|---|---|---|
| 4,262,267 | 4/1981 | Schimitschet et al. | 372/86 |
| 4,342,114 | 7/1982 | Luck | 372/87 |
| 4,380,079 | 4/1983 | Cohn et al. | 372/86 |

*Primary Examiner*—James W. Davie
*Attorney, Agent, or Firm*—Karl F. Ross

[57] ABSTRACT

A pair of excitation electrodes in a laser cavity, filled with a gas mixture at substantially atmospheric pressure, are connected across a pumping capacitor by way of part of the winding of an autotransformer in series with a pre-ionizing device within the cavity acting as a trigger switch. The pre-ionizing device comprises a dielectric tube carrying a plurality of axially spaced-apart metal rings constituting a condenser chain, the rings being provided with pointed extensions confronting one another to serve as corona electrodes. Contral pulses applied to a conductor inside the tube cause a spark discharge through the cascaded corona gaps of the trigger switch with resulting energization of the autotransformer and discharge of the pumping capacitor across the excitation electrodes. The metal rings may be interconnected by high-ohmic resistors establishing a uniform field distribution therebetween.

5 Claims, 2 Drawing Figures

PRE-IONIZING TRIGGER SYSTEM FOR A GAS LASER

FIELD OF THE INVENTION

Our present invention relates to a pulsed gas laser, particularly though not exclusively to a laser known under the designation TEA (for "Transversely Excited Atmospheric") in which the gas mixture in its cavity is maintained at or near atmospheric pressure.

BACKGROUND OF THE INVENTION

It is known that at gas pressures in a laser cavity exceeding a few tens of torr the discharges periodically generated between a pair of excitation electrodes may become irregular, changing from a uniform glow to one or more localized arcs to the detriment of the emitted beams. This drawback can be eliminated by the use of ancillary corona electrodes which pre-ionize the gaseous atmosphere of the cavity. In some instances, separate high-voltage pulse sources are being used for the energization of the main and the ancillary electrodes; these sources might include, for example, diferent trigger switches in the form of a spark gap and a thyratron, respectively. It is also known to energize the corona electrodes in parallel with the main electrodes by the same high-voltage spikes through a common spark gap; see, for instance, U.S. Pat. No. 4,292,600.

OBJECTS OF THE INVENTION

An object of our present invention is to provide a simplified circuit arrangement for the pre-ionization of a gas-filled laser cavity concurrently with the discharge of the main electrodes across the cavity.

A related object is to provide a more compact structure for such a laser.

A further object is to minimize the emission of electromagnetic transients liable to interfere with the operation of other equipment.

SUMMARY OF THE INVENTION

In accordance with our present invention, a pumping capacitor continuously charged by a high-voltage source is connected across the excitation electrodes of a laser by a discharge circuit including a trigger switch which comprises a nonconductive support in the laser cavity provided with a plurality of spaced-apart metallic bodies forming a condenser chain, these bodies having pointed extensions which confront each other across intervening gaps and act as corona electrodes; the support is juxtaposed with a generator of recurrent control pulses for periodically modifying the electric field set up by the capacitor charge across the condenser chain in order to initiate spark discharges between the corona electrodes for establishing a conductive path across their gaps.

In the preferred embodiment of our invention more fully described hereinafter, the nonconductive support is a tube on which the metallic bodies are carried at axially spaced locations in the form of rings. This enables the periodically pulsed conductor to be disposed inside the tube for capacitive coupling with at least some of the surrounding metal rings.

In order to establish a predetermined and preferably uniform field distribution between the several conductive bodies forming the condenser chain, we prefer to interconnect these bodies by high-ohmic resistors constituting a voltage divider. The overall resistance of this voltage divider, of course, should be sufficient to prevent a discharge of the main electrodes across the laser cavity in the absence of spark discharges between the corona electrodes.

BRIEF DESCRIPTION OF THE DRAWING

The above and other features of our invention will now be described in detail with reference to the accompanying drawing in which.

SPECIFIC DESCRIPTION

Figure 1:
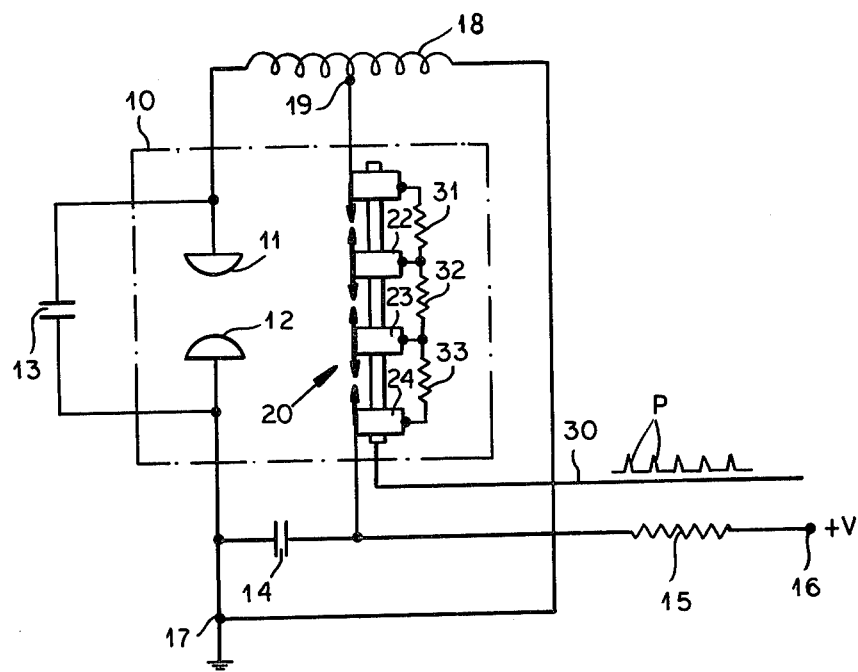
FIG. 1 is a circuit diagram of a laser embodying our invention.
Figure 2:
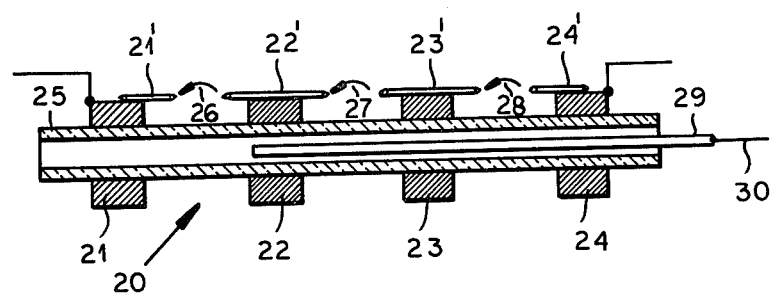
FIG. 2 is an axial sectional view of a trigger switch included in the diagram of FIG. 1.

In FIG. 1 we have diagrammatically indicated a laser cavity 10 with two main or excitation electrodes 11, 12 bridged by a so-called peaking capacitor 13 designed to control the shape of the discharge pulses produced by these electrodes. A pumping capacitor 14 is connected, via a resistor 15, across a source of high d-c voltage +V represented by a positive terminal 16 and a grounded terminal 17. The latter terminal is connected directly to electrode 12 and via an autotransformer winding 18 to electrode 11. A tap 19 on that winding, preferably located at the center thereof, is coupled to the junction of capacitor 14 with resistor 15 via a trigger switch generally designated 20 and illustrated in greater detail in FIG. 2.

Trigger switch 20 comprises several axially spaced metallic rings 21, 22, 23, 24 mounted on the outer wall surface of a nonconductive tube 25 of quartz or alumina, for example. The rings are provided with pointed extensions 21', 22', 23', 24' which act as corona electrodes and are separated by spark gaps 26, 27 and 28. A metalllic rod 29 extending axially inside tube 25 is connected by a lead 30 to a nonillustrated generator of control pulses or spikes P indicated in FIG. 1. As likewise shown in FIG. 1, rings 21–24 are galvanically interconnected by high-ohmic sections 31, 32, 33 of a resistive voltage divider. Moreover, the first ring 21 is connected to winding tap 19 while the last ring 24 is tied to the junction of capacitor 14 with resistor 15.

In operation, pumping capacitor 14 is charged with voltage +V by way of resistor 15 while the tap 19 is approximately at ground potential. Thus, a large potential difference substantially equal to the capacitor voltage exists between rings 21 and 24 of trigger switch 20, with one-third of that potential difference lying across each corona gap 26-28. If, now, conductive rod 29 is energized with a positive pulse P, that pulse will be capacitively transmitted to ring 22 so as to increase the potential difference across gap 26, causing a breakdown. The resulting spark discharge increases the potential difference across gap 27 which therefore is also ignited. In like manner, the discharge is extended to gap 28 so that a relatively low-ohmic conductive path now extends across capacitor 14 by way of the right-hand half of winding 18; the partial discharge of the capacitor through that path gives rise to a stepped-up voltage difference across electrodes 11 and 12, thereby generating a flash in the laser cavity 10 whose atmosphere is ionized by the ultraviolet radiation from the sparks developed across corona electrodes 21'-24'. Since all these spark discharges occur within the cavity, there is virtually no radiation of interfering electromagnetic energy to external equipment.

We claim:

1. In a laser having a gas-filled cavity, a pair of spaced-apart excitation electrodes in said cavity, a pumping capacitor continuously charged by a source of electrical energy with a grounded terminal and a high-voltage terminal, and a discharge circuit including a trigger switch connecting said pumping capacitor across said excitation electrodes, the improvement wherein one of said excitation electrodes is directly connected to ground and said trigger switch comprises a nonconductive support in said cavity provided with a plurality of spaced-apart metallic bodies forming a condenser chain between the other of said excitation electrodes and said high-voltage terminal, said bodies having pointed extensions confronting each other across intervening gaps, and a conductor juxtaposed with said support in the vicinity of one of said gaps and connected to a generator of recurrent control pulses for periodically modifying the electric field set up across said condenser chain by the charge of said pumping capacitor to initiate spark discharges between said confronting extensions for establishing a conductive path across said gaps, thereby closing said discharge circuit.

2. A laser as defined in claim 1 wherein said support is a tube, said bodies being rings carried at axially spaced locations on the outer wall surface of said tube.

3. A laser as defined in claim 2 wherein said conductor extends partly within said tube and terminates at said one of said gaps.

4. A laser as defined in claim 1, 2 or 3 wherein the nonconductive material of said support is taken from the group which consists of quartz and alumina.

5. A laser as defined in claim 1, 2 or 3, further comprising an autotransformer winding connected across said excitation electrodes and provided with a tap connected to a terminal of said condenser chain whereby a portion of said winding is included in said discharge circuit.

* * * * *